(12) United States Patent
Dardis et al.

(10) Patent No.: US 10,782,899 B2
(45) Date of Patent: Sep. 22, 2020

(54) ADAPTIVE MEMORY TRAINING FOR ENHANCED AUTOMOTIVE BOOT

(71) Applicant: Intel Corporation, Santa Clara, CA (US)

(72) Inventors: Sean Christopher Dardis, Hillsboro, OR (US); Michael Alan Kubacki, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 16/017,758

(22) Filed: Jun. 25, 2018

(65) Prior Publication Data
US 2019/0050160 A1 Feb. 14, 2019

(51) Int. Cl.
G06F 3/06 (2006.01)
G06F 12/00 (2006.01)
G01D 9/00 (2006.01)
G01K 1/02 (2006.01)

(52) U.S. Cl.
CPC .......... G06F 3/0632 (2013.01); G06F 3/0604 (2013.01); G06F 3/0611 (2013.01); G06F 3/0616 (2013.01); G06F 3/0634 (2013.01); G06F 3/0673 (2013.01); G06F 3/0683 (2013.01); G06F 12/00 (2013.01); G01D 9/005 (2013.01); G01K 1/022 (2013.01)

(58) Field of Classification Search
CPC .... G06F 3/0632; G06F 3/0673; G06F 3/0604; G06F 3/0683; G06F 3/0634; G06F 3/0616; G06F 3/0611; G06F 12/00; G01K 1/00; G01D 9/005; B60L 58/12; G05D 1/0088
See application file for complete search history.

(56) References Cited

U.S. PATENT DOCUMENTS

2008/0318547 A1* 12/2008 Ballou, Jr. .......... H04L 63/0838
455/410
2019/0294173 A1* 9/2019 Szubbocsev ......... G05D 1/0274

* cited by examiner

Primary Examiner — David Lam
(74) Attorney, Agent, or Firm — Schwegman Lundberg & Woessner, P.A.

(57) ABSTRACT

A computerized component, designed to be used in a vehicle, is able to detect an ambient environmental variable; determine a memory profile corresponding to the ambient environmental variable; access memory parameters from the memory profile; and configure memory of the computerized component based on the accessed memory parameters. Another computerized component may be used to detect that the computerized component is initiating a shutdown procedure; obtain an ambient environmental variable, the ambient environmental variable indicating a state of an operating environment of the computerized component; identify memory parameters of random access memory integrated with the computerized component; and write the memory parameters to a memory profile stored in non-volatile storage in the computerized component, the memory profile keyed to the ambient environmental variable.

10 Claims, 11 Drawing Sheets

ADAPTIVE MEMORY TRAINING FOR ENHANCED AUTOMOTIVE BOOT

TECHNICAL FIELD

Embodiments described herein generally relate to memory management, and in particular, to training memory to enhance automotive boot processes.

BACKGROUND

Vehicles are increasingly computerized and equipped with sensors and other electronics. The electronics, processors, and other computerized components of a vehicle are used to monitor engine controls, provide driver assistance systems, enable safety features, and support other functions.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Vehicles are equipped with a plethora of electronics to support engine control, the transmission, safety systems, navigation, air bags, climate controls, seating, entertainment systems, and the like. An autonomous vehicle includes computer systems to control steering, braking, sensors, artificial intelligence systems, vehicle-to-vehicle communication, infrastructure-to-vehicle communication, and other systems to support partial or fully autonomous driving. Autonomous driving systems must meet stringent regulatory requirements for boot time while also operating in a diverse range of environmental conditions. A key step in system boot is training memory to find the optimal read/write timing and voltage for system functionality and performance. Training duration scales with memory size and error detection coverage while overall system boot constraints remain fixed or decrease over time.

Today's Memory Reference Code (MRC) firmware stores training data to non-volatile storage to improve boot time on subsequent boots. However, the margin envelope may be compromised with time and environmental conditions such as temperature or humidity. Any deviation from an acceptable margin threshold elicits a new memory training which substantially impacts boot time. As a result, a substantial problem is that conventional memory training forces an inflexible tradeoff between boot time, defect coverage, and performance, especially in autonomous vehicle systems.

The present disclosure provides an architecture and related systems to improve system boot time and robustness over its lifetime. Instead of a single MRC training data set, multiple data sets may be stored and loaded to match the current operating conditions. This mechanism, along with other aspects, are further described in the figures and description that follow.

Figure 1:
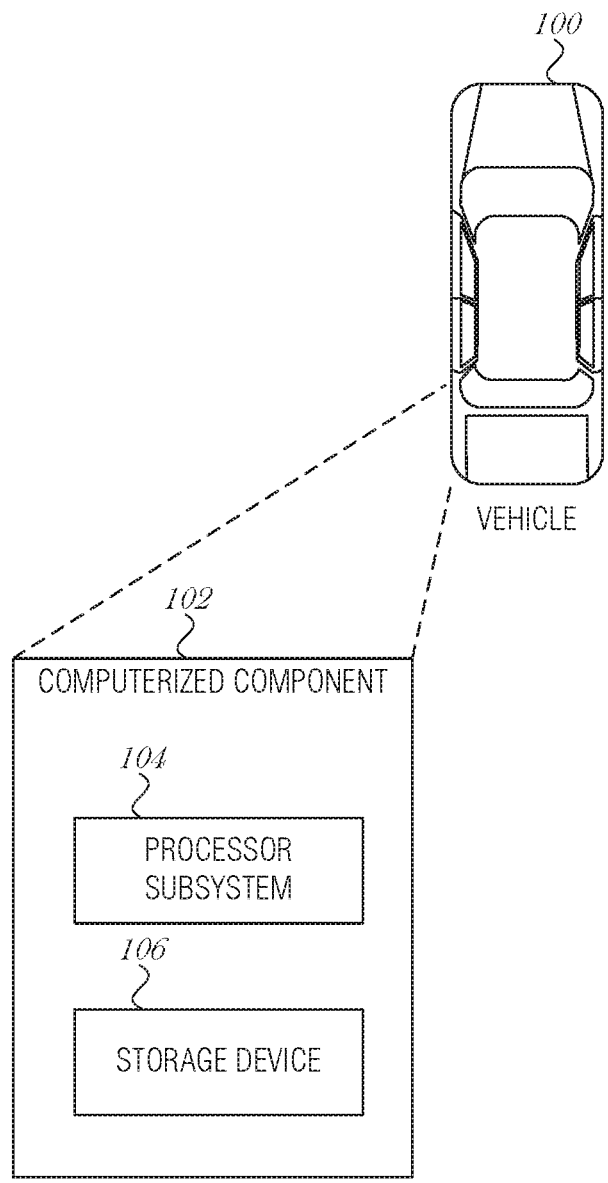
FIG. 1 is a schematic drawing illustrating a vehicle, according to an embodiment.

FIG. 1 is a schematic drawing illustrating a vehicle 100, according to an embodiment. FIG. 1 includes one or more computerized components 102 incorporated into the vehicle 100. The vehicle 100 may be of any type of vehicle, such as a commercial vehicle, a consumer vehicle, a recreation vehicle, a car, a truck, a motorcycle, airplane, or a boat. The vehicle 100 may be an autonomous or semi-autonomous vehicle. In general, the computerized component 102 includes a processor subsystem 104, and a storage device 106. The processor subsystem 104 may include one or more processors, each with one or more cores. Additionally, the processor subsystem 104 may be disposed on one or more physical devices. The processor subsystem 104 may include one or more specialized processors, such as a graphics processing unit (GPU), a digital signal processor (DSP), a field programmable gate array (FPGA), or a fixed function processor.

The storage device 106 includes one or more devices used to store data. A storage device 106 may include any non-transitory mechanism for storing information in a form readable by a machine (e.g., a computer). For example, a storage device 106 may include read-only memory (ROM), random-access memory (RAM), magnetic disk storage media, optical storage media, flash-memory devices, or other storage devices and media.

The computerized component 102 may be installed as an after-market component of the vehicle 100, or may be provided as a manufacturer option. As an after-market component, the computerized component 102 may plug into the existing infrastructure in the vehicle 100.

The computerized component 102 may support, enable, integrate, provide, or be used in one of many subsystems in a vehicle 100, including but not limited to engine control systems, navigation systems, driver assistance systems, safety systems, infotainment systems, and the like.

For instance, the computerized component 102 may support, enable, integrate, or provide a sensor array, which may include various forward, side, and rearward facing cameras, radar, LIDAR, ultrasonic, or similar sensors.

In another aspect, the computerized component 102 may support, enable, or be integrated with various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

In another aspect, the computerized component 102 may support, enable, or be integrated with an on-board diagnostics system to record vehicle operation and other aspects of the vehicle's performance, maintenance, or status. The onboard diagnostics system may determine various vehicle state data, such as whether the windshield wipers are activated, whether the driving lights are activated, whether a sunroof is open or closed, etc.

Components of the computerized component 102 may communicate using a network, which may include local-area networks (LAN), wide-area networks (WAN), wireless networks (e.g., IEEE 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

Figure 2:
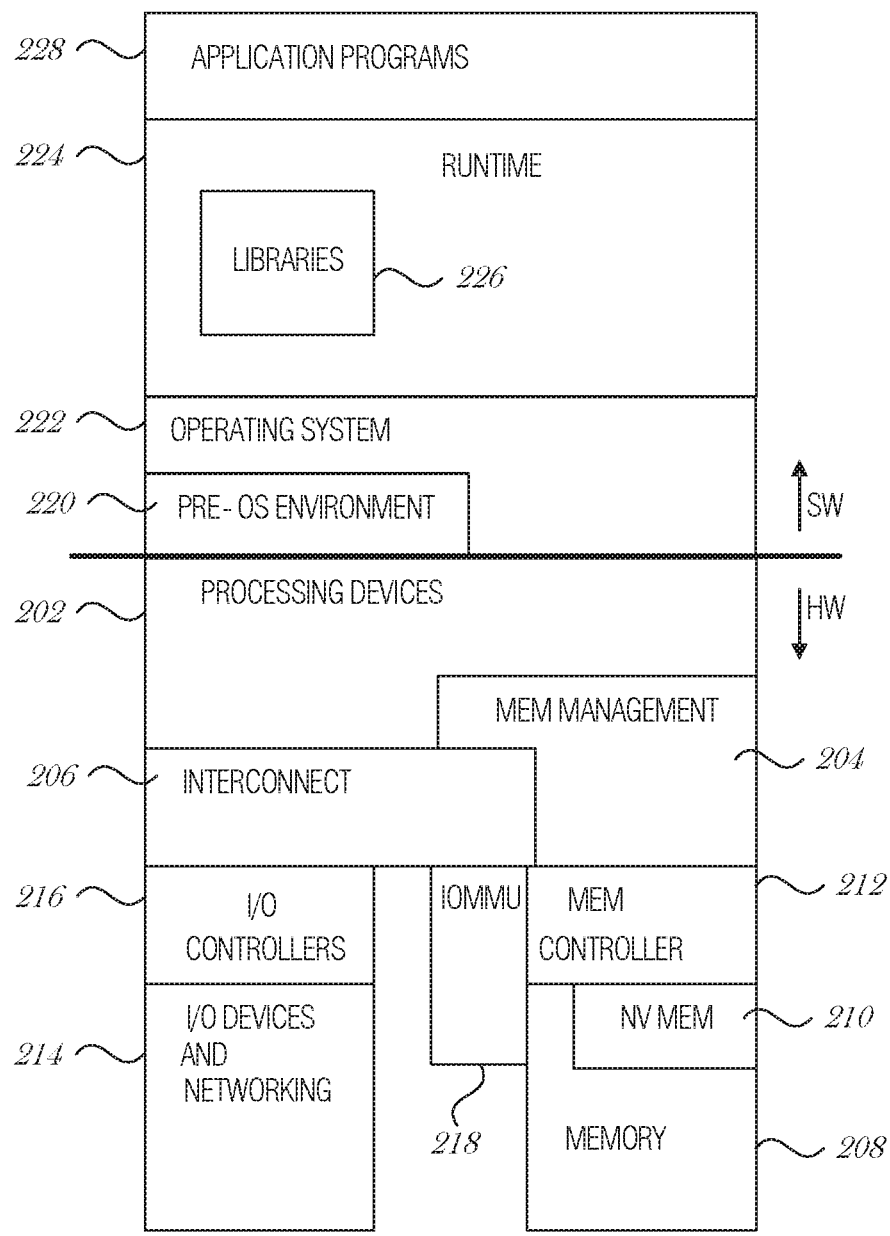
FIG. 2 is a diagram illustrating hardware and software architecture 200 of a computerized component, such as the computerized component of FIG. 1, in which various interfaces between hardware components and software components are shown, according to an embodiment.

FIG. 2 is a diagram illustrating hardware and software architecture 200 of a computerized component, such as the computerized component 102 described above, in which various interfaces between hardware components and software components are shown, according to an embodiment. As indicated in FIG. 2 by "HW," hardware components are represented below the divider line, whereas software components (denoted by "SW") reside above the divider line. On the hardware side, processing devices 202 (which may include one or more microprocessors, digital signal processors, etc., each having one or more processor cores, are interfaced with memory management device 204 and system interconnect 206. Memory management device 204 provides mappings between virtual memory used by processes being executed, and the physical memory. Memory management device 204 may be an integral part of a central processing unit which also includes the processing devices 202.

Interconnect 206 includes a backplane such as memory, data, and control lines, as well as the interface with input/output devices, e.g., PCI, USB, etc. Memory 208 (e.g., dynamic random access memory—DRAM) and non-volatile memory 210 such as flash memory (e.g., electrically-erasable read-only memory—EEPROM, NAND Flash, NOR Flash, etc.) are interfaced with memory management device 204 and interconnect 206 via memory controller 212. This architecture 200 may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 214, which interface with interconnect 206 via corresponding I/O controllers 216.

In a related embodiment, input/output memory management unit IOMMU 218 supports secure direct memory access (DMA) by peripherals. IOMMU 218 may provide memory protection by meditating access to memory 208 from I/O device 214. IOMMU 218 may also provide DMA memory protection in virtualized environments, where it allows certain hardware resources to be assigned to certain guest VMs running on the system, and enforces isolation between other VMs and peripherals not assigned to them.

On the software side, a pre-operating system (pre-OS) environment 220, which is executed at initial system start-up and is responsible for initiating the boot-up of the operating system. One traditional example of pre-OS environment 220 is a system basic input/output system (BIOS). In present-day systems, a unified extensible firmware interface (UEFI) may be implemented. Pre-OS environment 220, is responsible for initiating the launching of the operating system, but also provides an execution environment for embedded applications.

A portion of the pre-OS environment 220 is the Memory Reference Code (MRC). The MRC is responsible for initializing the memory 208. This is performed as part of a POST process. The MRC firmware saves memory training data to non-volatile memory 210 to improve boot times on subsequent boots. On subsequent boots, so long as no exception cases have occurred, the data from non-volatile memory 210 is re-used.

Operating system (OS) 222 provides one or more kernels that control the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 222 provides device drivers, and a variety of common services such as those that facilitate interfacing with peripherals and networking, that provide abstraction for application programs so that the applications do not need to be responsible for handling the details of such common operations. Operating system 222 additionally provides a graphical user interface (GUI) that facilitates interaction with the user via peripheral devices such as a monitor, keyboard, mouse, microphone, video camera, touchscreen, and the like.

Runtime system 224 implements portions of an execution model, including such operations as putting parameters onto the stack before a function call, the behavior of disk input/output (I/O), and parallel execution-related behaviors. Runtime system 224 may also perform support services such as type checking, debugging, or code generation and optimization.

Libraries 226 include collections of program functions that provide further abstraction for application programs. These include shared libraries, dynamic linked libraries (DLLs), for example. Libraries 226 may be integral to the operating system 222, runtime system 224, or may be added-on features, or even remotely-hosted. Libraries 226 define an application program interface (API) through which a variety of function calls may be made by application programs 228 to invoke the services provided by the operating system 222. Application programs 228 are those programs that perform useful tasks for users, beyond the tasks performed by lower-level system programs that coordinate the basic operability of the computing device itself.

Depending on the design of the computerized component, some aspects that are described in FIG. 2 may be omitted or combined with other aspects.

In conventional systems, memory training is performed at boot up, impacting boot time and reducing initial system availability. This slow boot time may violate regulatory startup time requirements, which are particularly short for vehicles. Boot time memory training may be less rigorous in order to allow the system to boot successfully. By using more conservative parameters, the system may boot successfully, but the memory parameters are not optimized for the best performance. Additionally, defect coverage and fault detection may have less specificity in order to meet boot time requirements.

The systems described in FIGS. 1-2 improve on the operation of the computerized component by pre-training memory. Memory training is performed on the memory 208 under a variety of environmental conditions. Multiple profiles are created with one for each environmental condition. The profiles include various memory training parameters including, but not limited to timing parameters, voltage parameters, and memory frequency. The profiles are stored as profiles in the non-volatile memory 210.

Figure 3:
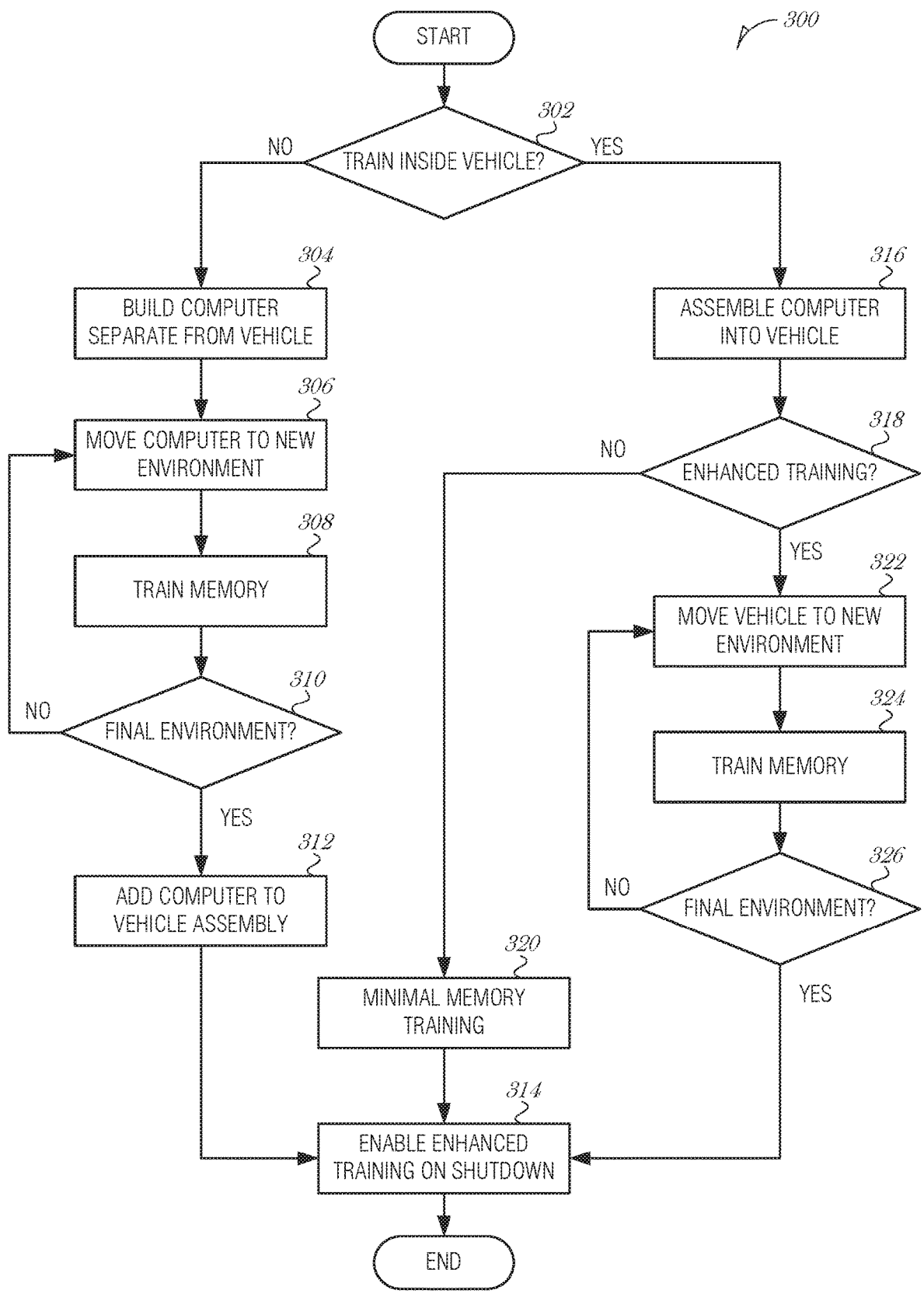
FIG. 3 is a flow diagram illustrating a training process, according to an embodiment.

FIG. 3 is a flow diagram illustrating a training process 300, according to an embodiment. A computerized component is trained, at least in part, during vehicle manufacture. The computerized component may be trained in parallel with other vehicle assembly lines, where the computerized component is trained while not attached or integrated with the vehicle frame, body, or other components. Alternatively, the computerized component may be trained after being incorporated, integrated, affixed, or assembled into a subassembly or the vehicle assembly. Training may include MRC training. PCIe link training, or the like. Decision operation 302 indicates whether the computerized component is to be trained separate from the vehicle or after being integrated into the vehicle assembly.

If the computerized component is to be trained separate from the vehicle, then at operation 304, the computerized component is built, assembled, manufactured, or otherwise constructed separate from the vehicle. For instance, the computerized component may be built offsite from the vehicle assembly line. Alternatively, the computerized component may be built and tested in a separate facility that is near the vehicle assembly line. The location of where the manufacturing, building, and testing of the computerized component is not significant here, so long as it is built and tested separate from the vehicle assembly. It is understood that the computerized component may be integrated into a subassembly, such as a dashboard subassembly, and tested with other components. There is no requirement that the computerized component be tested in its bare configuration.

At operation 306, the computerized component is moved to a new environment. The new environment may differ from other testing environments based on an ambient temperature, humidity, atmospheric pressure, or the like. Environmental factors may influence the operation of memory incorporated into the computerized component. Several artificial environments may be constructed to train the computerized component before it is placed into field operation.

At operation 308, the memory is trained. Training memory may include various operations such as stepping through memory frequency ranges, voltages, latencies, timing parameters, and other parameters. Memory training is used to determine an optimal set of memory parameters for the testing environment. The memory parameters and other training data is stored in a profile. The training data may include an operating envelope. The envelope may be expressed as a range of environments in which the memory parameters are usable. For example, the envelope may be a temperature range of +/−25° F. around the current ambient temperature. Several profiles may be stored together on non-volatile memory in the computerized component. These profiles are used during operation after manufacturing to operate the memory in a more optimized configuration than a default or base configuration.

At decision operation 310, it is determined whether additional testing environments exist. If so, then the computer is moved to another testing environment (operation 306), and the memory is trained again. Multiple environments may be used to test the memory under a variety of conditions. For instance, a set of environments may be used at −20° Fahrenheit (F.), 0° F., 20° F., 40° F., 60° F., 80° F., and 100° F. Each environment may have an operating range (e.g., envelope) around the set temperature, such as +/−10° F., or +/−30° F. (which allows for overlapping operating environments).

Once training is completed across the various testing environments, the computerized component may be incorporated into the vehicle assembly (operation 312). Any profiles not created at manufacturing may be created in the field. The manufacturer may choose from varying levels of time to spend on memory training. In most cases, it is expected the minimal time will be spent in manufacturing and profile data will be extended further once the vehicle is deployed.

After training is complete, enhanced training on shutdown is enabled (operation 314). This flag may be set before or after adding the computerized component to the vehicle assembly (operation 312). Enhanced training at shutdown is described more below. However, generally, this configuration flag is used to control when enhanced training is used in the field. Setting the flag to perform enhanced training at shutdown configures the computerized component to train when the vehicle and the computerized component are shutdown. Training at shutdown reduces or eliminates user-perceived delay because the training, which may take many seconds or even minutes to perform, is performed after the driver is finished using the vehicle. Performing enhanced training in the field allows the computerized component to adapt to environmental conditions and actual performance of the computerized component when in use. Wear-in and other factors may affect the performance of the computerized component. Field-based enhanced training accommodates for these changes.

If, instead, the computerized component is to be trained after being assembled into the vehicle, then at operation 316, the computerized component is first assembled into the vehicle. At decision operation 318, it is determined whether enhanced training is to be used. If enhanced training is not to be used, then at operation 320, minimal training is performed. Enhanced training takes extra time during manufacturing. Also, extra manufacturing and assembly facilities are required to perform the enhanced training. So, a manufacturer may decide to selectively enable enhanced training for some vehicles, vehicle models, or the like.

Minimal training (operation 320) may train the memory at whatever ambient temperature or other environmental conditions exist. Minimal training may only train the memory once and with looser thresholds than an enhanced training regimen. Minimal training is designed to allow the memory to perform in the field (e.g., after being retailed to an end consumer), but it may not provide optimal memory performance. After minimal training (operation 320), enhanced training on shutdown is enabled (operation 314).

Returning to decision operation 318, if enhanced training is enabled, then at 322, the vehicle with the computerized component is moved to a new environment. For instance, the vehicle assembly line may move the vehicle body and other components, including the computerized component under test, into a new room that has a controlled environment. The environment may be adjusted to a setting, such as a controlled ambient temperature, and memory testing may commence (operation 324). After memory training is completed for the instant environment, then it is determined whether more test environments exist (decision operation 326). If so, then the vehicle is moved to a new environment 322 and additional memory training (operation 324) is performed. This enhanced training is similar to the training performed in operation 308 and may determine optimal timing and voltage parameters for the memory, and perform other error detection operations on the memory. The vehicle assembly line may move the vehicle to multiple rooms, each room having a separate test environment. Alternatively, the vehicle may stay in the same room and the room's environment may be altered to train the memory under new conditions. Once all the test environments are exhausted, the enhanced training on shutdown is enabled (operation 314) and the process ends.

Figure 4:
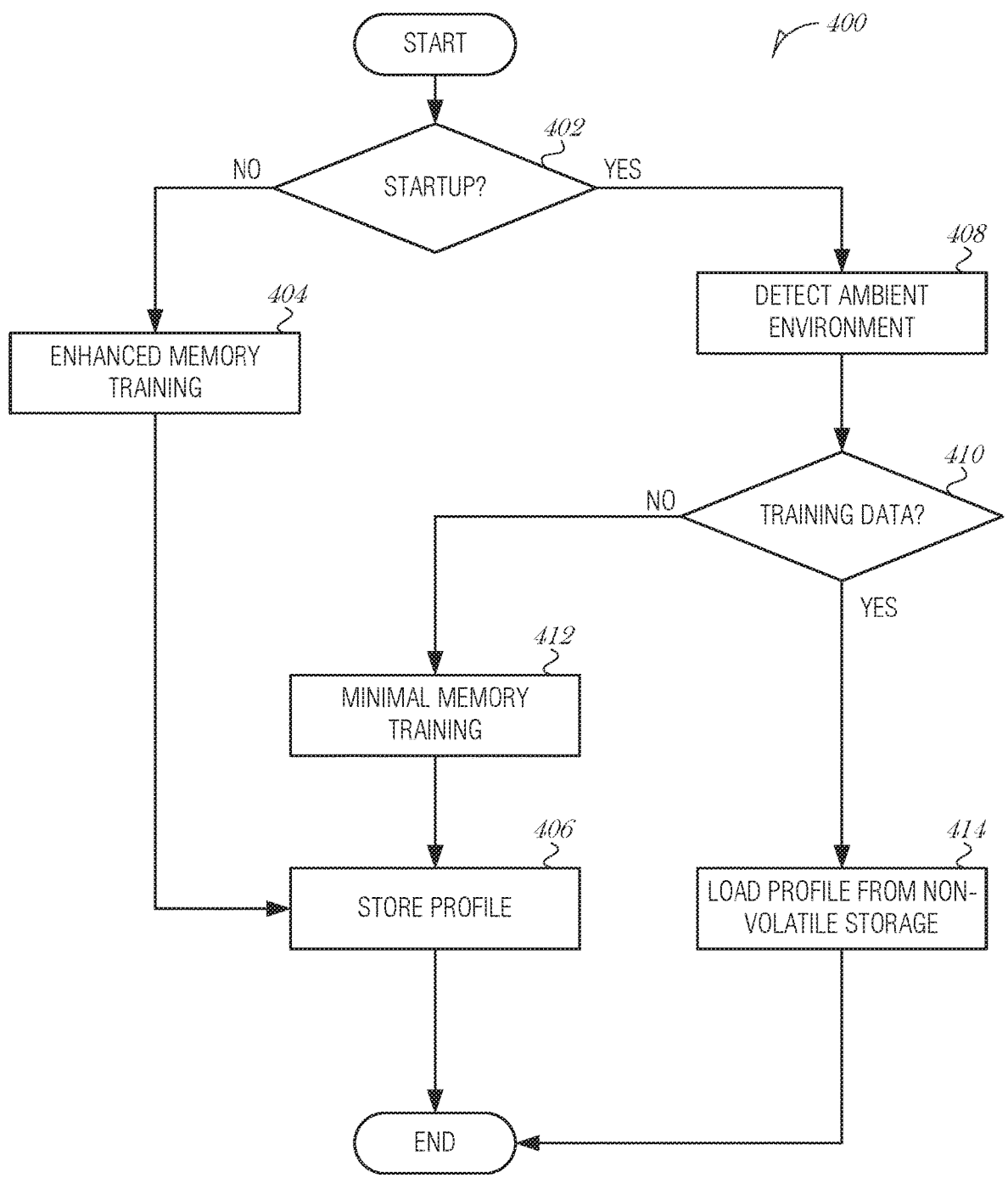
FIG. 4 is a flow diagram illustrating a training process, according to an embodiment.

FIG. 4 is a flow diagram illustrating a training process 400, according to an embodiment. At 402, it is determined whether the computerized component is being started up or shut down. If shutting down, then enhanced memory training is performed (operation 404), and the memory parameters are stored in a profile (operation 406). The memory parameters are stored with operating environment information, such as the ambient temperature, ambient humidity, or the like. The profiles are stored in non-volatile memory for access during the next boot up sequence. If memory training is interrupted for any reason, such as the user restarting the vehicle, the system performs a recovery procedure. The recovery procedure may include an immediate global reset forfeiting any memory training and preventing training data from being saved. Alternatively, the recovery procedure may restore a last known working configuration, a default configuration that was created using minimal training, a factory profile, or the like.

If booting up, then at operation 408, an aspect of the ambient environment is detected. For instance, the ambient temperature may be determined using a temperature sensor. Pre-trained profiles are stored in the non-volatile memory and are associated with an environmental variable (e.g., temperature) or a range of environmental variables. At decision operation 410, it is determined whether there is any training data available in non-volatile memory for the particular environmental variable (e.g., training data for a range that includes the current temperature). If there is no enhanced training data for the specific value of the environmental variable, then in an implementation, a default functional profile is used. The default profile may be one that is functional over a wide range of environments, but is not optimized. This default profile may be set at manufacturing.

If, however, there is no training data found, then at operation 412, a minimal memory training procedure is used. This minimal memory training procedure may be a fast training algorithm to enable basic memory functionality and performance. It is designed to minimize the amount of time needed for memory training during startup, when the vehicle operator is waiting for the vehicle to become operational. After the minimal parameters are found, they are stored in a profile associated with the detected ambient environmental variable (operation 406).

If there is training data available, then at operation 414, a profile is loaded from non-volatile memory. This reduces the amount of time needed to train the memory at startup while also providing a tailored memory training for the particular operating environment, which provides improved memory performance compared to a minimal memory training set.

Figure 5:
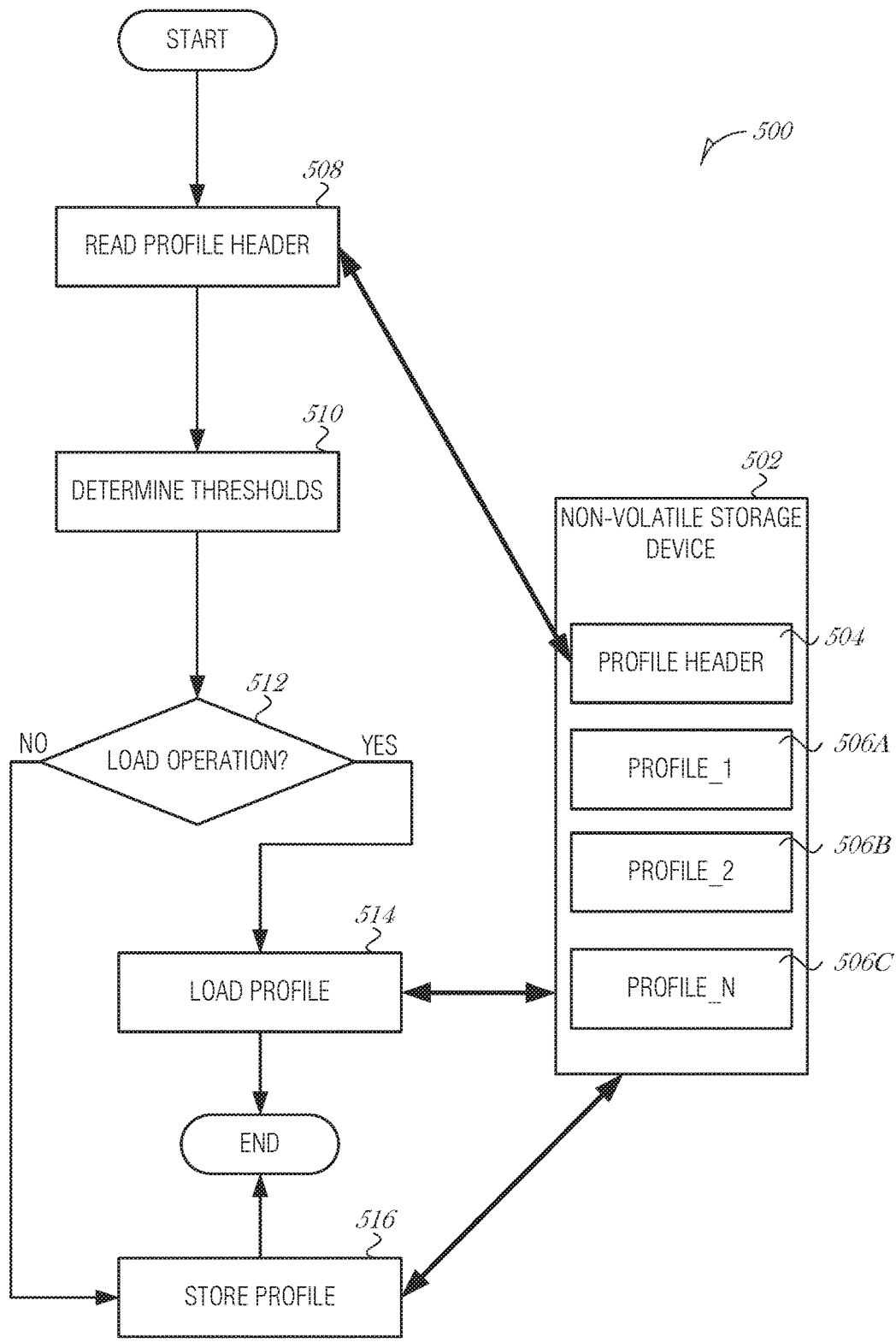
FIG. 5 is a flow diagram illustrating a process of using environmental profiles, according to an embodiment.

FIG. 5 is a flow diagram illustrating a process of using environmental profiles 500, according to an embodiment. Profiles are stored in a non-volatile memory device 502, which may be integrated with storage device 106 of FIG. 1, or non-volatile memory 210 of FIG. 2. The non-volatile memory device 502 includes a profile header 504 and one or more profiles 506A-C (collectively referred to as 506). The profiles 506 may keyed (e.g., indexed) on a particular environmental variable, such as temperature. Alternatively, the profiles 506 may be keyed on multiple environmental variables (e.g., temperature and humidity). In the embodiment illustrated in FIG. 5, the profiles 506 are keyed on temperature.

When accessing the non-volatile memory device 502 to read or write profiles 506, the profile header 504 is read (operation 508). The profile header 504 may include various data structure information of the profile header 504 and the profiles 506. For instance, the profile header 504 may include a total data size of the profile header 504 and profiles 506. The profile header 504 may also include a signature portion, which may be used to identify the profile header 504 in memory 502.

In an implementation, the profile header 504 includes ranges for the environmental variable (e.g., temperature ranges). This range information is used when saving the profiles 506 to non-volatile memory 502 based on the ambient temperature detected.

In another implementation, a range threshold is stored in the profile header 504. The range threshold is applied to all profiles 506. The range threshold may be expressed as a plus or minus a certain value. For instance, the range threshold may be expressed as "+/−10° F." or "+40° F./−25° F.". In an embodiment, profiles 506 may have their own range information, which if present, are used to override the range threshold from the profile header 504. The ranges may be established by the training process used to obtain the memory parameters.

At operation 510, environmental thresholds are determined from the profile header 504. Environmental thresholds may be expressed as a range plus or minus a given environmental data point. For instance, a threshold may be expressed as +/−20° F. Alternatively, environmental thresholds are expressed as a range of values, e.g., 42° F.-52° F. With more profiles 506 available, the ranges may be adjusted to be tighter. For instance, with a hundred profiles 506 available, the ranges may be from +/−5° F. instead of a larger +/−20° F., or 42° F.-52° F. instead of 22° F.-72° F. This tighter tolerance may provide better initial memory performance.

At decision operation 512, it is determined whether the operation is a load operation (e.g., at system startup) or a save operation (e.g., at system shutdown). If it is a load operation, then at 514, an ambient environmental variable is obtained (e.g., a current ambient temperature), and a profile 506 that includes the ambient environmental variable within the range provided by the profile header is retrieved from the non-volatile memory device 502. The look up determines the ranges that are applicable and selects the most centered range. For instance, if a range threshold is provided in the profile header 504, then the temperature stored in the profile 506 is referenced, the range threshold is applied, and it is determined whether the ambient temperature falls within the range of the profile. Alternatively, if the profile header 504 includes various ranges and their corresponding profiles, then the ranges may be evaluated and the profile 506 may be selected.

If there is no matching profile, then a minimal memory training routine may be used (e.g., operation 412 of FIG. 4) or a default profile may be retrieved for use. The default profile may be programmed at manufacture and provide a relatively large range of operating variance.

If, instead, it is a save operation, then at 516, an ambient environmental variable is obtained (e.g., a current ambient humidity), and a profile 506 is stored to the non-volatile memory device 502. If a profile 506 exists for the environmental variable data point, e.g., a profile for 50° F. exists, the profile 506 is overwritten. The new training data is used to revise existing memory parameters. This re-saved re-trained data may be used to account for degradation of silicon, for example.

The systems and procedures disclosed here allow automotive customers to eliminate memory retraining during system boot up due to temperature change and electrical degradation over time in the field. This process also reduces manufacturing time by allowing training data profiles to be built outside the assembly process and reducing or eliminating new memory training after shipping to customer's climates.

To optimize system startup time, these systems and procedures move the memory training procedure from the conventional boot process to the system shutdown process. In an automotive environment, this means the memory training would occur after vehicle is off and the computer system(s) is ready to transition a low-power system state. In this state, ample time is allowed for "enhanced memory training" to be requested. By training after system shutdown, more time consuming operations may be used to improve system robustness, power usage, and performance. This addresses issues such as fault isolation and enhanced margining methods.

Figure 6:
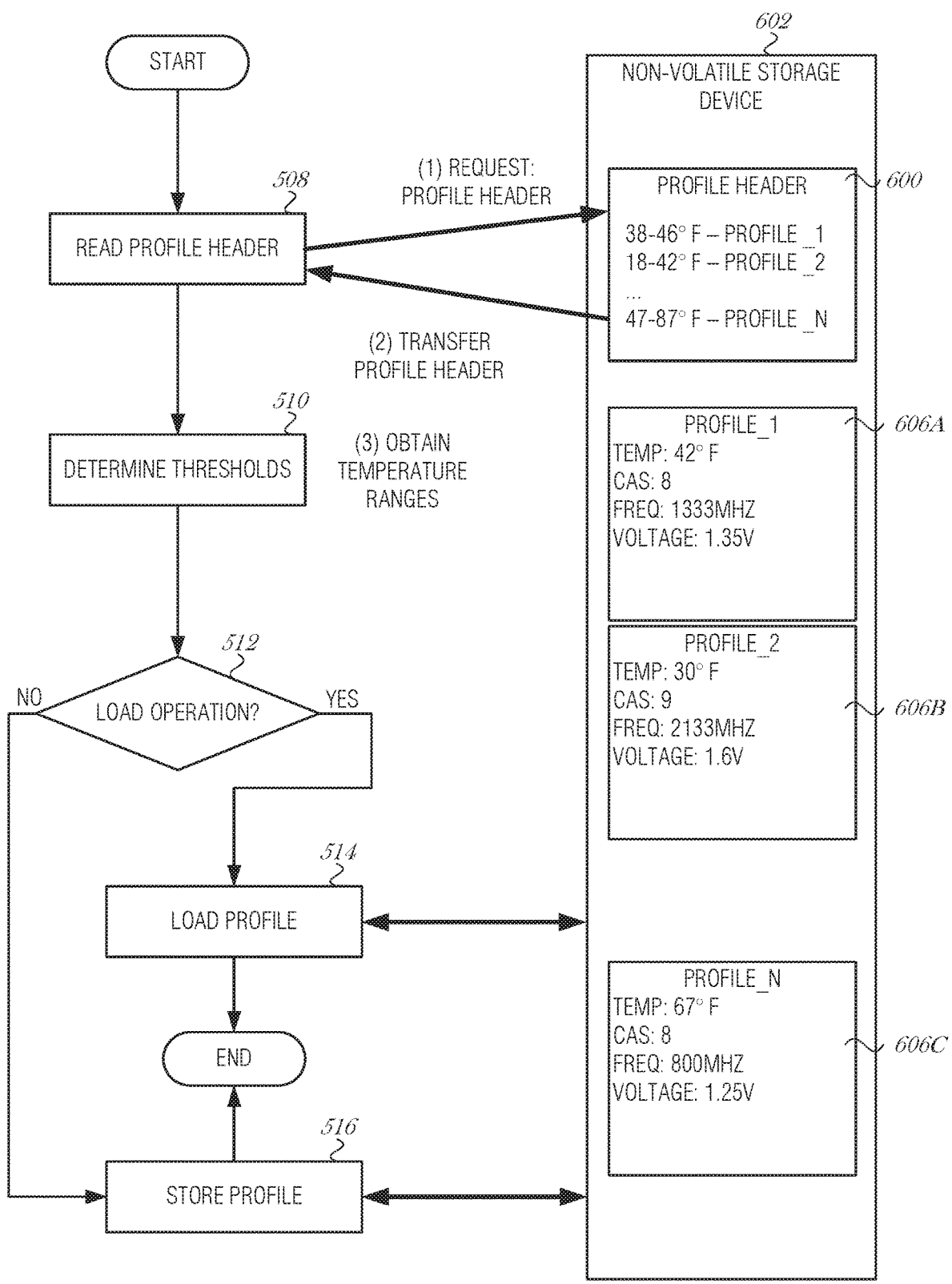
FIG. 6 is data and control flow diagram illustrating a process of using environmental profiles, according to an embodiment.

FIG. 6 is data and control flow diagram illustrating a process of using environmental profiles, according to an embodiment. The process may be an instance of operation 414 of FIG. 4, where the profile is loaded from non-volatile memory (operation 508). In this illustrative example, the profiles are keyed on temperature. The computerized component may request the profile header 600 (transaction 1). The profile header 600 is read from the non-volatile storage device 602 (transaction 2). When evaluating the range thresholds (operation 510), the ranges for the temperature profiles 606A-C are identified by analyzing the profile header (operation 3).

In a load operation, the computerized component obtains the current ambient temperature. If, for example, the ambient temperature is 62° F. The computerized component is then able to scan the profiles 606A-C and identify a closest match. Each profile 606A-C includes memory parameters and the temperature at which the parameters were trained. In this example. Column Address Strobe (CAS) latency, frequency, and voltage are shown. It is understood that other memory parameters may be trained, such as Row Address Strobe (RAS) to CAS delay, RAS Pre-charge, active to pre-charge delay, cycle time, row refresh cycle time, command rate, base clock rate, memory multiplier, RAM ratio, and the like.

Based on the available profiles 606, the closest match is PROFILE_N 606C. The computerized component may refer to the temperature range obtained from the profile header 600. Here, the ambient temperature is 62° F. only falls inside of a range that corresponds with PROFILE_N. Because the profile 606C was obtained at a temperature within the range provided in the profile header 600, the profile 606C is used to configure the random access memory of the computerized component.

In another example, the ambient temperature may be 41° F. In this case, the ranges of PROFILE_1 and PROFILE_2 encompass the current ambient temperature. However, the ambient temperature of 41° F. is more centered in the temperature range of PROFILE_1, 38° F.-46° F. as opposed to the range of 47° F.-87° F. of PROFILE_2. The evaluation of "more centered" compares the average of the range with the ambient temperature to determine a difference. The difference found when evaluating PROFILE_1 is (38+46)/2−41=1. The difference found when evaluating PROFILE_2 is (47+87)/2−41=4.25. Thus, in this case, the ambient temperature of 41° F. is more centered to the PROFILE_1 range, and the parameters in PROFILE_1 are used to initially configure the memory device.

If, instead, the operation is to store the profile, then a profile 606 is stored with the ambient temperate at the time the memory parameters are trained. Optionally, the time or date may be stored in the profile 606. The time or date may be used to age the profile 606, for instance, to remove older profiles 606 to make room for more current ones.

It is understood that the sequence of operations illustrated in FIG. 6 may be altered without departing from the scope of the disclosure. For instance, the load operation 512 may occur before the profile header is read (operation 508) or the thresholds are determined (operation 510).

Figure 7:
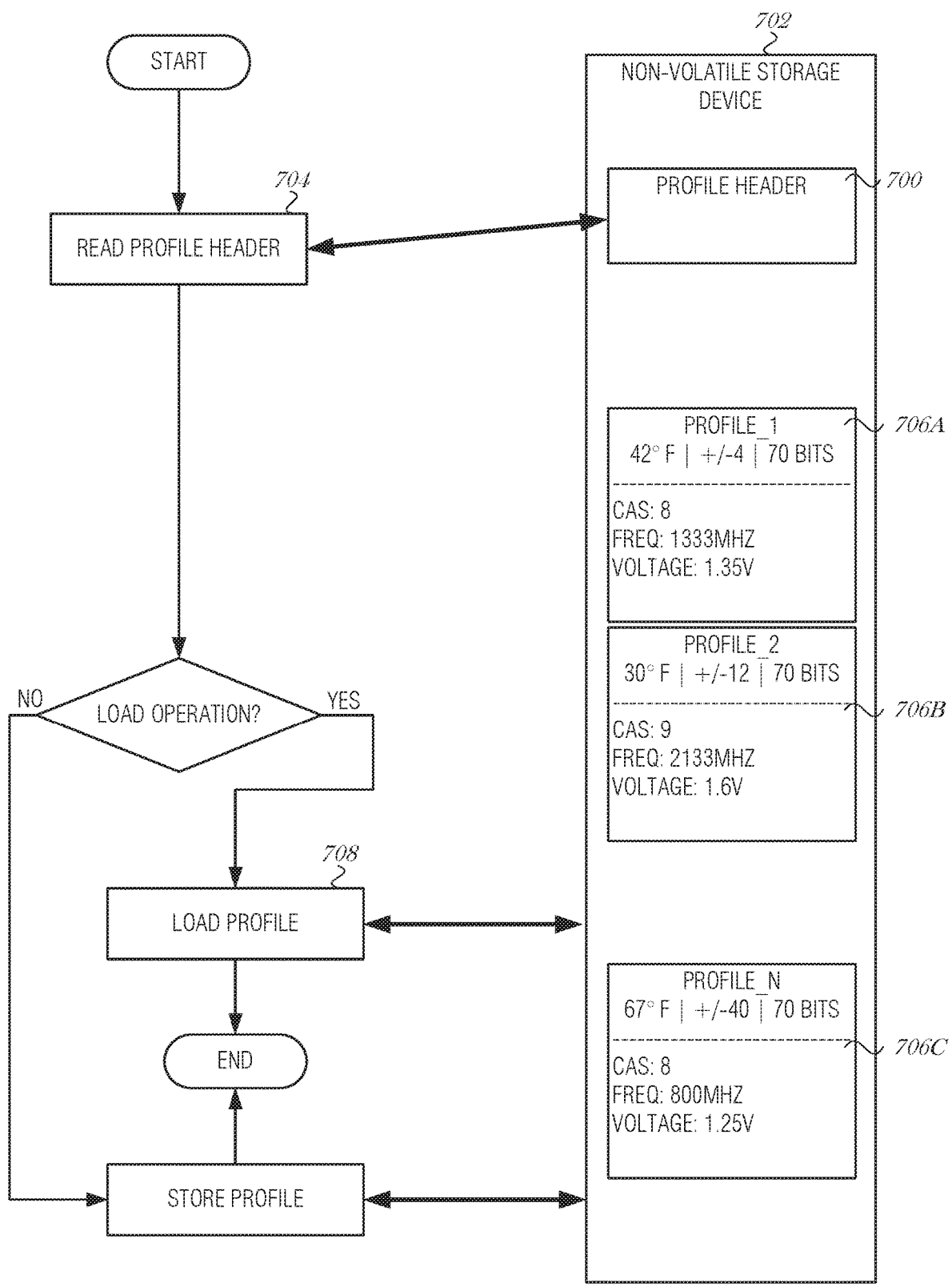
FIG. 7 is data and control flow diagram illustrating another process of using environmental profiles, according to an embodiment.

FIG. 7 is data and control flow diagram illustrating another process of using environmental profiles, according to an embodiment. The process may be an instance of operation 414 of FIG. 4, where the profile is loaded from non-volatile memory (operation 704). In this illustrative example, the profiles are keyed on temperature. The computerized component may request the profile header 700. The profile header 700 is read from the non-volatile storage device 702. The profile header 700 is read to obtain the size of the data structure in the storage device 702. The profile header 700 may also include an address of the first profile (e.g., profile 706A), when the profiles 706 are not stored in contiguous memory or when profiles 706 are stored in a second memory device 702.

Each profile 706 includes a header portion and a data portion. The header portion includes the data size, ambient temperature when the memory parameters were trained, and a tolerance range. For instance, the ambient temperature is 42° F. with a tolerance of +/−4° F. for PROFILE_1 706A. The data size is used by the load operation to move to the next profile 706 for processing. Providing the data size in the header of each profile 706 allows for flexible-sized header and data portions in the profiles 706.

In the load operation (operation 708), the computerized component obtains the current ambient temperature. If, for example, the ambient temperature is 44° F. The computerized component is then able to scan the profiles 706A-C and identify a closest match. The computerized component may refer to the temperature range obtained from the header of the profiles 706. Here, the ambient temperature is 44° F. and that falls within the range of PROFILE_1 (42° F.+/−4° F.) and PROFILE_2 (30° F.+/−12° F.). Note that the tolerance for PROFILE_1 706A is obtained from the profile header 700 (e.g., +/−4° F.), and the tolerance for PROFILE_2 706B is obtained from the header of the profile 706B (e.g., +/−12° F.).

Based on the evaluation of the temperature ranges of each profile 706 compared with the ambient temperature, the closest match is PROFILE_1, which is used to configure the memory.

Figure 8:
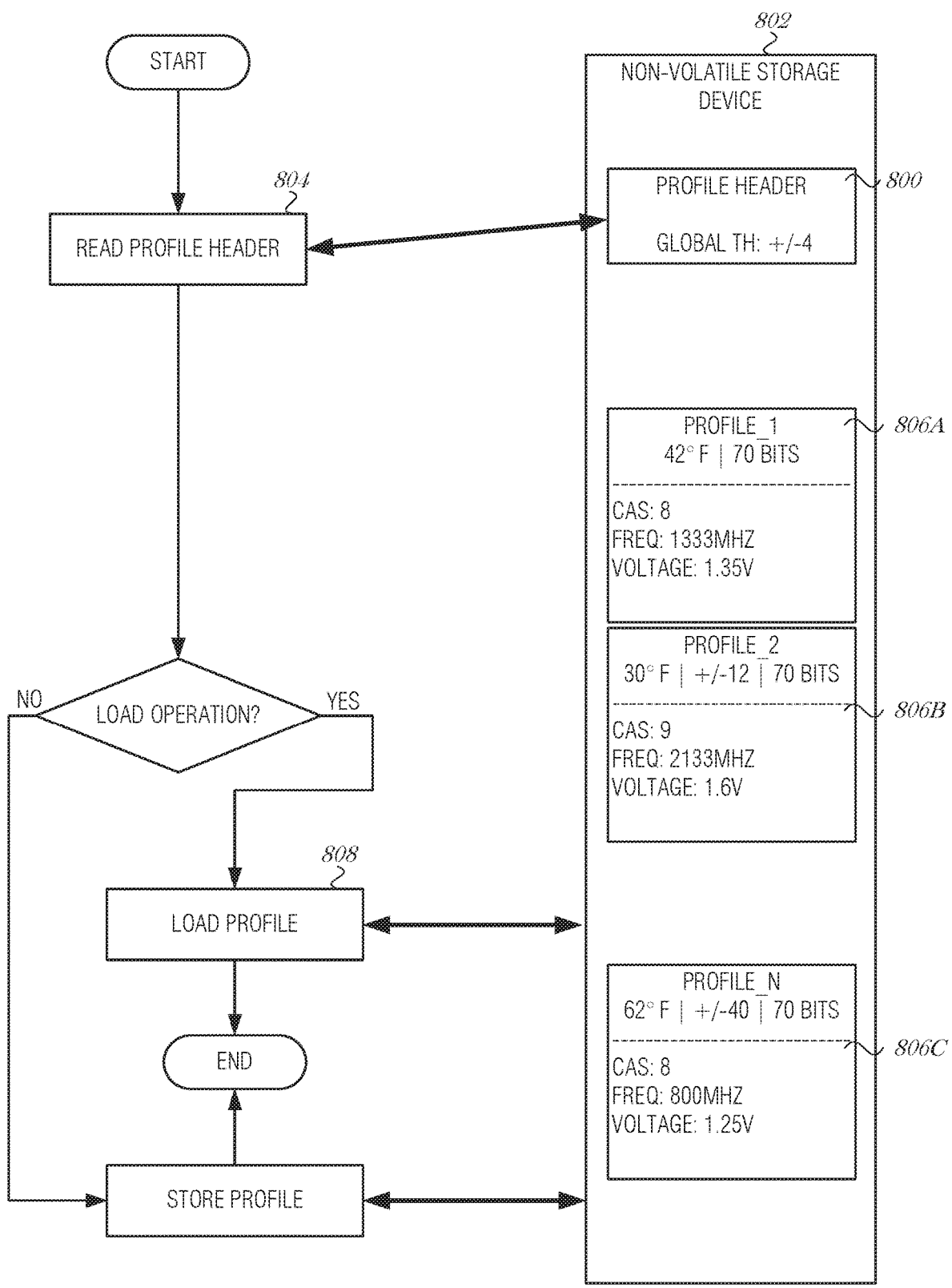
FIG. 8 is data and control flow diagram illustrating another process of using environmental profiles, according to an embodiment.

FIG. 8 is data and control flow diagram illustrating another process of using environmental profiles, according to an embodiment. The process may be an instance of operation 414 of FIG. 4, where the profile is loaded from non-volatile memory (operation 804). Similar to the embodiment illustrated in FIG. 7, headers of each profile may be used to store a header portion and a data portion. The header portion may include some or all of the parameters: data size, ambient temperature when the memory parameters were trained, and a tolerance range. For instance, the ambient temperature is 30° F. with a tolerance of +/−12° F. for PROFILE_2 806B. The data size is used by the load operation to move to the next profile 806 for processing. Providing the data size in the header of each profile 806 allows for flexible-sized header and data portions in the profiles 806.

In the example illustrated in FIG. 8, the profile header 800 includes a global setting for the threshold range. Here, it is illustrated as +/−4° F. It is understood that the threshold may be provided as two parts, such as −4° F.+8° F. When a tolerance range is not stored in the profile 806, then the global threshold range is used. For instance, PROFILE_1 806A has a temperature of 42° F. which is the temperature at which the system was when the memory parameters were trained and stored in PROFILE_1 806A. The profile 806A does not have a tolerance range, so the global threshold is used and the operational range of PROFILE_1 806A is 38° F. to 46° F.

Evaluating which profiles 806 are usable for the current ambient temperature during the load profile operation 808 is similar to that described elsewhere and not repeated here to reduce redundancy.

Figure 9:
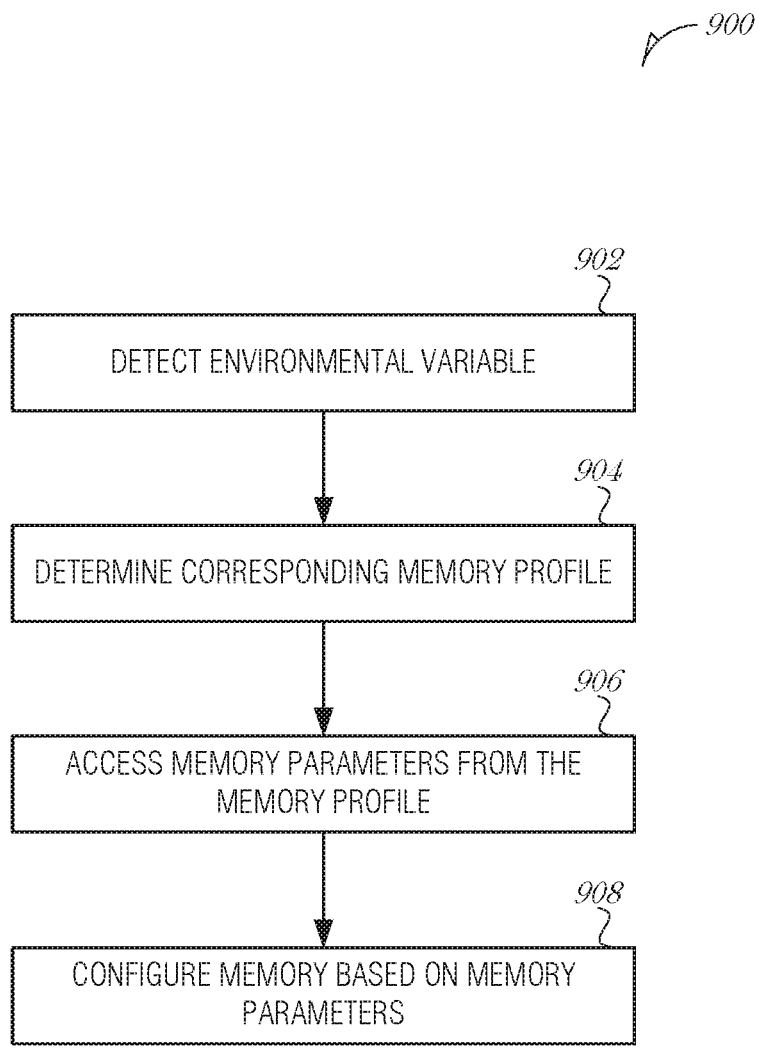
FIG. 9 is a flowchart illustrating a method for training memory to enhance automotive boot processes, according to an embodiment.

FIG. 9 is a flowchart illustrating a method 900 for training memory to enhance automotive boot processes, according to an embodiment. At 902, an ambient environmental variable is detected at a computerized component installed in a vehicle. In an embodiment, the ambient environmental variable is temperature. In another embodiment, the ambient environmental variable is humidity. The ambient environmental variable may be detected by a sensor that is integrated into the computerized component.

At 904, a memory profile corresponding to the ambient environmental variable is determined. For instance, the memory profile is looked up based on the current state of the ambient environmental variable, such as is illustrated in FIGS. 3-8.

At 906, memory parameters are accessed from the memory profile. The profile may have fixed-length fields, each field including a memory parameter, such as CAS, frequency, and voltage.

At 908, memory of the computerized component is configured based on the accessed memory parameters. The memory may be configured via a memory controller.

In an embodiment, the memory profile is stored in non-volatile storage in the computerized component. In an embodiment, the memory profile includes a frequency and a voltage to configure the memory. In an embodiment, the memory profile is organized with a profile header, the profile header used for a plurality of memory profiles to configure a threshold range of the environmental variable. For instance, the profile header may include a threshold range that is used for memory profiles as a tolerance of the environmental variable expressed in the memory profile.

In an embodiment, the memory profile is organized in a profile header, the profile header including a stored environmental variable, the stored environmental variable being the state of an environmental variable when the memory profile was saved. In a further embodiment, the profile header includes a threshold range of the environmental variable.

Figure 10:
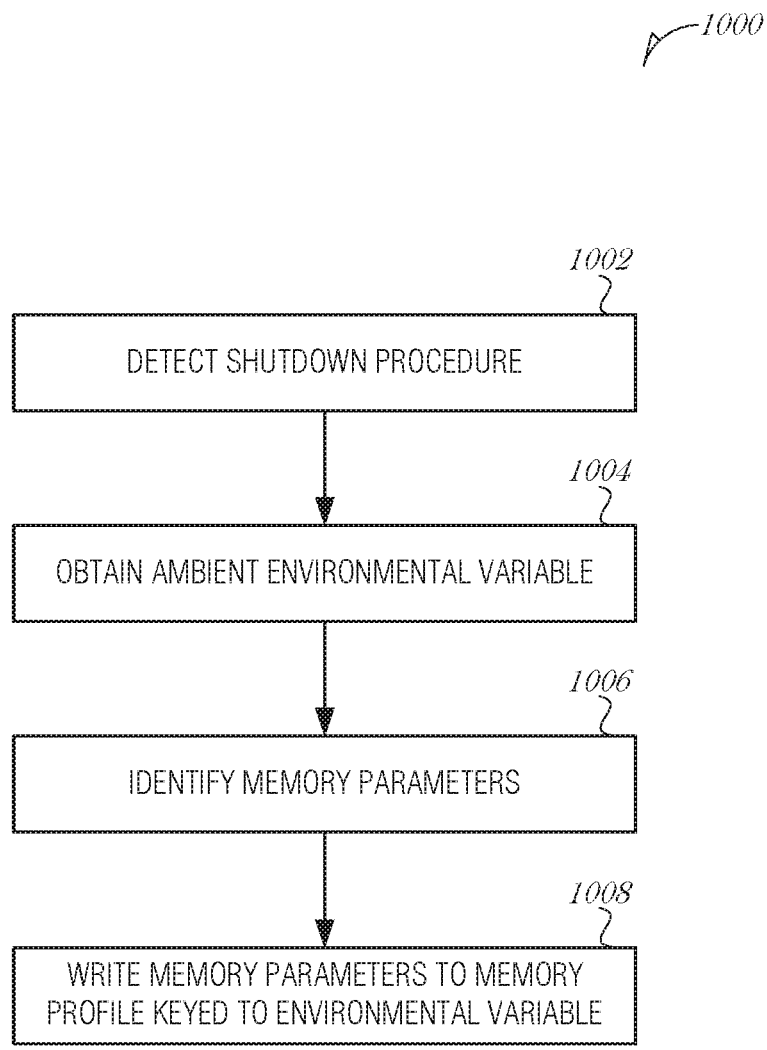
FIG. 10 is a flowchart illustrating a method for training memory to enhance automotive boot processes, according to an embodiment.

FIG. 10 is a flowchart illustrating a method 1000 for training memory to enhance automotive boot processes, according to an embodiment. At 1002, it is detected at a computerized component installed in a vehicle, that the computerized component is initiating a shutdown procedure. The shutdown procedure may be detected from a hardware or software signal, interrupt, global variable setting, event, or the like. At the user-level, a shutdown may be initiated by powering off an infotainment unit, a radio, or an electronic component. Additionally, the shutdown procedure may be detected when the vehicle is turned off (e.g., ignition is stopped, or when an on/off button is pressed to turn off a vehicle). When the user action is detected, a global event may be triggered to initiate shutdown processes. The shutdown processes may gracefully exit various processes, applications, or other systems. The graceful exit may include storing current system state, performing integrity checks, performing safety checks, and the like. As described throughout this document, the shutdown procedure may also include performing memory training.

At 1004, an ambient environmental variable is obtained, the ambient environmental variable indicating a state of an operating environment of the computerized component. In an embodiment, the ambient environmental variable is temperature. In another embodiment, the ambient environmental variable is humidity.

At 1006, memory parameters of random access memory integrated with the computerized component are identified. For instance, the memory parameters are obtained by querying a memory controller that interfaces with the memory device.

At 1008, the memory parameters are written to a memory profile stored in non-volatile storage in the computerized component, the memory profile keyed to the ambient environmental variable. In an embodiment, the memory profile is stored in non-volatile storage in the computerized component. In an embodiment, the memory profile includes a frequency and a voltage to configure the memory.

In a further embodiment, the method 1000 includes writing a profile header, the profile header including the ambient environmental variable. In a further embodiment, the method 1000 includes writing a threshold range of the ambient environmental variable to the profile header.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 11:
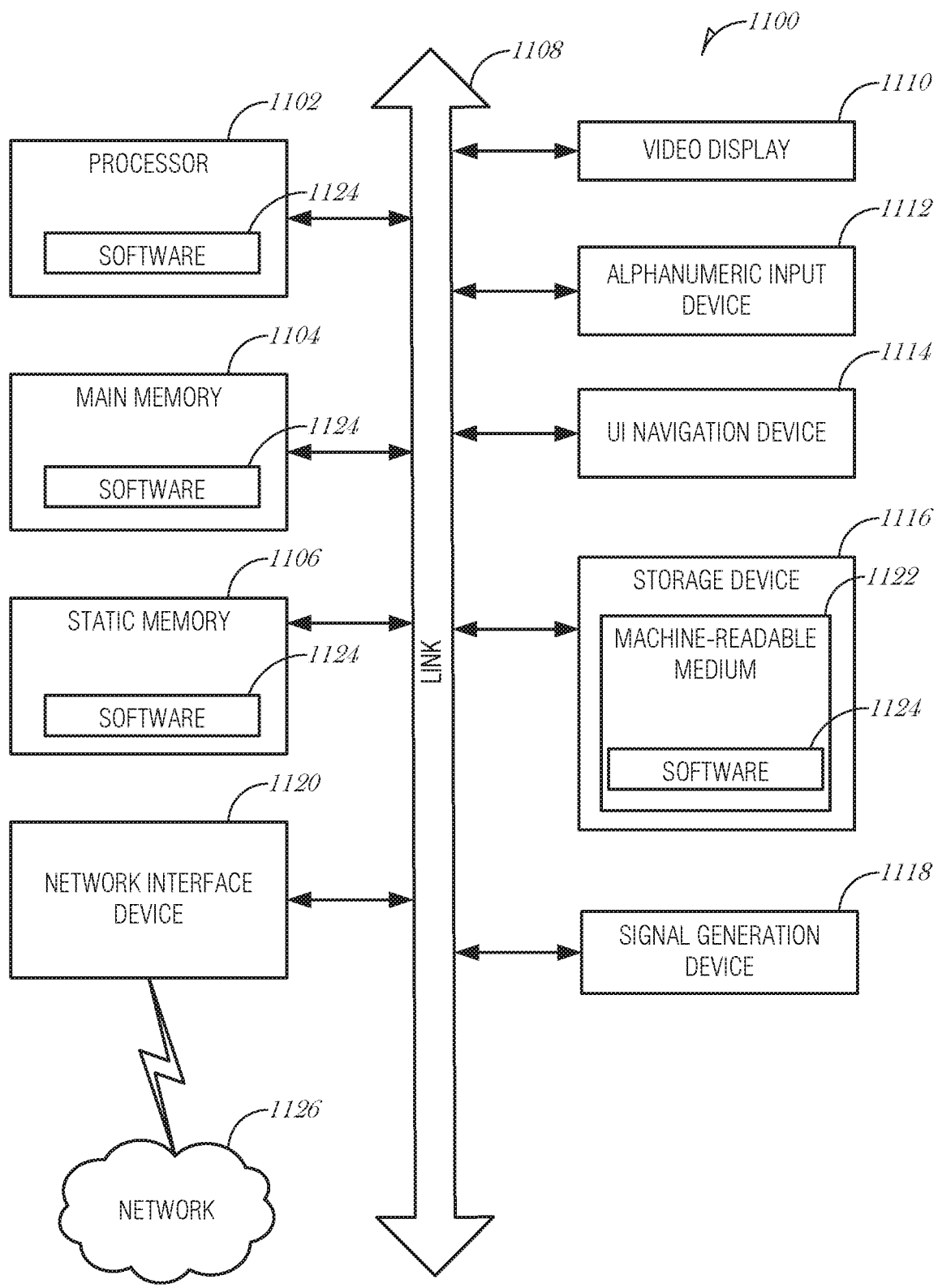
FIG. 11 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 11 is a block diagram illustrating a machine in the example form of a computer system 1100, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an infotainment system, a driver's assistance system, a safety system, an engine control system, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1100 includes at least one processor 1102 (e.g., a central processing unit (CPU), a graphics processing unit (GPU) or both, processor cores, compute nodes, etc.), a main memory 1104 and a static memory 1106, which communicate with each other via a link 1108 (e.g., bus). The computer system 1100 may further include a video display unit 1110, an alphanumeric input device 1112 (e.g., a keyboard), and a user interface (UI) navigation device 1114 (e.g., a mouse). In one embodiment, the video display unit 1110, input device 1112 and UI navigation device 1114 are incorporated into a touch screen display. The computer system 1100 may additionally include a storage device 1116 (e.g., a drive unit), a signal generation device 1118 (e.g., a speaker), a network interface device 1120, and one or more sensors (not shown), such as a global positioning system (GPS) sensor, compass, accelerometer, gyrometer, magnetometer, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a computerized component, designed to be used in a vehicle, the computerized component comprising: a processor subsystem; and memory including instructions, which when executed by the processor subsystem, cause the processor subsystem to: detect an ambient environmental variable; determine a memory profile corresponding to the ambient environmental variable; access memory parameters from the memory profile; and configure memory of the computerized component based on the accessed memory parameters.

In Example 2, the subject matter of Example 1 includes, wherein the ambient environmental variable is temperature.

In Example 3, the subject matter of Examples 1-2 includes, wherein the ambient environmental variable is humidity.

In Example 4, the subject matter of Examples 1-3 includes, wherein the memory profile is stored in non-volatile storage in the computerized component.

In Example 5, the subject matter of Examples 1-4 includes, wherein the memory profile includes a frequency and a voltage to configure the memory.

In Example 6, the subject matter of Examples 1-5 includes, wherein the memory profile is organized with a profile header, the profile header used for a plurality of memory profiles to configure a threshold range of the environmental variable.

In Example 7, the subject matter of Examples 1-6 includes, wherein the memory profile is organized with a profile header, the profile header including a stored environmental variable, the stored environmental variable being the state of an environmental variable when the memory profile was saved.

In Example 8, the subject matter of Example 7 includes, wherein the profile header includes a threshold range of the environmental variable.

Example 9 is a method comprising: detecting, at a computerized component installed in a vehicle, an ambient environmental variable; determining a memory profile corresponding to the ambient environmental variable; accessing memory parameters from the memory profile; and configuring memory of the computerized component based on the accessed memory parameters.

In Example 10, the subject matter of Example 9 includes, wherein the ambient environmental variable is temperature.

In Example 11, the subject matter of Examples 9-10 includes, wherein the ambient environmental variable is humidity.

In Example 12, the subject matter of Examples 9-11 includes, wherein the memory profile is stored in non-volatile storage in the computerized component.

In Example 13, the subject matter of Examples 9-12 includes, wherein the memory profile includes a frequency and a voltage to configure the memory.

In Example 14, the subject matter of Examples 9-13 includes, wherein the memory profile is organized with a profile header, the profile header used for a plurality of memory profiles to configure a threshold range of the environmental variable.

In Example 15, the subject matter of Examples 9-14 includes, wherein the memory profile is organized with a profile header, the profile header including a stored environmental variable, the stored environmental variable being the state of an environmental variable when the memory profile was saved.

In Example 16, the subject matter of Example 15 includes, wherein the profile header includes a threshold range of the environmental variable.

Example 17 is at least one machine-readable medium including instructions, which when executed by a machine, cause the machine to perform operations of any of the methods of Examples 9-16.

Example 18 is an apparatus comprising means for performing any of the methods of Examples 9-16.

Example 19 is an apparatus comprising: means for detecting, at a computerized component installed in a vehicle, an ambient environmental variable; means for determining a memory profile corresponding to the ambient environmental variable; means for accessing memory parameters from the memory profile; and means for configuring memory of the computerized component based on the accessed memory parameters.

In Example 20, the subject matter of Example 19 includes, wherein the ambient environmental variable is temperature.

In Example 21, the subject matter of Examples 19-20 includes, wherein the ambient environmental variable is humidity.

In Example 22, the subject matter of Examples 19-21 includes, wherein the memory profile is stored in non-volatile storage in the computerized component.

In Example 23, the subject matter of Examples 19-22 includes, wherein the memory profile includes a frequency and a voltage to configure the memory.

In Example 24, the subject matter of Examples 19-23 includes, wherein the memory profile is organized with a profile header, the profile header used for a plurality of memory profiles to configure a threshold range of the environmental variable.

In Example 25, the subject matter of Examples 19-24 includes, wherein the memory profile is organized with a profile header, the profile header including a stored environmental variable, the stored environmental variable being the state of an environmental variable when the memory profile was saved.

In Example 26, the subject matter of Example 25 includes, wherein the profile header includes a threshold range of the environmental variable.

Example 27 is at least one machine-readable medium including instructions, the instructions when executed by a computerized component installed in a vehicle, cause the computerized component to perform the operations comprising: detecting an ambient environmental variable; determining a memory profile corresponding to the ambient environmental variable; accessing memory parameters from the memory profile; and configuring memory of the computerized component based on the accessed memory parameters.

In Example 28, the subject matter of Example 27 includes, wherein the ambient environmental variable is temperature.

In Example 29, the subject matter of Examples 27-28 includes, wherein the ambient environmental variable is humidity.

In Example 30, the subject matter of Examples 27-29 includes, wherein the memory profile is stored in non-volatile storage in the computerized component.

In Example 31, the subject matter of Examples 27-30 includes, wherein the memory profile includes a frequency and a voltage to configure the memory.

In Example 32, the subject matter of Examples 27-31 includes, wherein the memory profile is organized with a profile header, the profile header used for a plurality of memory profiles to configure a threshold range of the environmental variable.

In Example 33, the subject matter of Examples 27-32 includes, wherein the memory profile is organized with a profile header, the profile header including a stored environmental variable, the stored environmental variable being the state of an environmental variable when the memory profile was saved.

In Example 34, the subject matter of Example 33 includes, wherein the profile header includes a threshold range of the environmental variable.

Example 35 is a computerized component, designed to be used in a vehicle, the computerized component comprising: a processor subsystem; and memory including instructions, which when executed by the processor subsystem, cause the processor subsystem to: detect that the computerized component is initiating a shutdown procedure; obtain an ambient environmental variable, the ambient environmental variable indicating a state of an operating environment of the computerized component; identify memory parameters of random access memory integrated with the computerized component; and write the memory parameters to a memory profile stored in non-volatile storage in the computerized component, the memory profile keyed to the ambient environmental variable.

In Example 36, the subject matter of Example 35 includes, wherein the ambient environmental variable is temperature.

In Example 37, the subject matter of Examples 35-36 includes, wherein the ambient environmental variable is humidity.

In Example 38, the subject matter of Examples 35-37 includes, wherein the memory profile is stored in non-volatile storage in the computerized component.

In Example 39, the subject matter of Examples 35-38 includes, wherein the memory profile includes a frequency and a voltage to configure the memory.

In Example 40, the subject matter of Examples 35-39 includes, wherein the instruction cause the processor subsystem to: write a profile header, the profile header including the ambient environmental variable.

In Example 41, the subject matter of Example 40 includes, wherein the instruction cause the processor subsystem to: write a threshold range of the ambient environmental variable to the profile header.

Example 42 is a method comprising: detecting, at a computerized component installed in a vehicle, that the computerized component is initiating a shutdown procedure; obtaining an ambient environmental variable, the ambient environmental variable indicating a state of an operating environment of the computerized component; identifying memory parameters of random access memory integrated with the computerized component; and writing the memory parameters to a memory profile stored in non-volatile storage in the computerized component, the memory profile keyed to the ambient environmental variable.

In Example 43, the subject matter of Example 42 includes, wherein the ambient environmental variable is temperature.

In Example 44, the subject matter of Examples 42-43 includes, wherein the ambient environmental variable is humidity.

In Example 45, the subject matter of Examples 42-44 includes, wherein the memory profile is stored in non-volatile storage in the computerized component.

In Example 46, the subject matter of Examples 42-45 includes, wherein the memory profile includes a frequency and a voltage to configure the memory.

In Example 47, the subject matter of Examples 42-46 includes, writing a profile header, the profile header including the ambient environmental variable.

In Example 48, the subject matter of Example 47 includes, writing a threshold range of the ambient environmental variable to the profile header.

Example 49 is at least one machine-readable medium including instructions, which when executed by a machine, cause the machine to perform operations of any of the methods of Examples 42-48.

Example 50 is an apparatus comprising means for performing any of the methods of Examples 42-48.

Example 51 is an apparatus comprising: means for detecting, at a computerized component installed in a vehicle, that the computerized component is initiating a shutdown procedure; means for obtaining an ambient environmental variable, the ambient environmental variable indicating a state of an operating environment of the computerized component; means for identifying memory parameters of random access memory integrated with the computerized component; and means for writing the memory parameters to a memory profile stored in non-volatile storage in the computerized component, the memory profile keyed to the ambient environmental variable.

In Example 52, the subject matter of Example 51 includes, wherein the ambient environmental variable is temperature.

In Example 53, the subject matter of Examples 51-52 includes, wherein the ambient environmental variable is humidity.

In Example 54, the subject matter of Examples 51-53 includes, wherein the memory profile is stored in non-volatile storage in the computerized component.

In Example 55, the subject matter of Examples 51-54 includes, wherein the memory profile includes a frequency and a voltage to configure the memory.

In Example 56, the subject matter of Examples 51-55 includes, means for writing a profile header, the profile header including the ambient environmental variable.

In Example 57, the subject matter of Example 56 includes, means for writing a threshold range of the ambient environmental variable to the profile header.

Example 58 is at least one machine-readable medium including instructions, the instructions when executed by a computerized component installed in a vehicle, cause the computerized component to perform the operations comprising: detecting that the computerized component is initiating a shutdown procedure; obtaining an ambient environmental variable, the ambient environmental variable indicating a state of an operating environment of the computerized component; identifying memory parameters of random access memory integrated with the computerized component; and writing the memory parameters to a memory profile stored in non-volatile storage in the computerized component, the memory profile keyed to the ambient environmental variable.

In Example 59, the subject matter of Example 58 includes, wherein the ambient environmental variable is temperature.

In Example 60, the subject matter of Examples 58-59 includes, wherein the ambient environmental variable is humidity.

In Example 61, the subject matter of Examples 58-60 includes, wherein the memory profile is stored in non-volatile storage in the computerized component.

In Example 62, the subject matter of Examples 58-61 includes, wherein the memory profile includes a frequency and a voltage to configure the memory.

In Example 63, the subject matter of Examples 58-62 includes, wherein the instructions cause the computerized component to perform the operations comprising: writing a profile header, the profile header including the ambient environmental variable.

In Example 64, the subject matter of Example 63 includes, wherein the instructions cause the computerized component to perform the operations comprising: writing a threshold range of the ambient environmental variable to the profile header.

Example 65 is at least one machine-readable medium including instructions that, when executed by processing circuitry, cause the processing circuitry to perform operations to implement of any of Examples 1-64.

Example 66 is an apparatus comprising means to implement of any of Examples 1-64.

Example 67 is a system to implement of any of Examples 1-64.

Example 68 is a method to implement of any of Examples 1-64.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computerized component, designed to be used in a vehicle, the computerized component comprising:
   a processor subsystem; and
   memory including instructions, which when executed by the processor subsystem, cause the processor subsystem to:
   detect an ambient environmental variable;
   determine a memory profile corresponding to the ambient environmental variable;

access memory parameters from the memory profile; and configure memory of the computerized component based on the accessed memory parameters.

2. The computerized component of claim 1, wherein the ambient environmental variable is temperature.

3. The computerized component of claim 1, wherein the ambient environmental variable is humidity.

4. The computerized component of claim 1, wherein the memory profile is stored in non-volatile storage in the computerized component.

5. The computerized component of claim 1, wherein the memory profile includes a frequency and a voltage to configure the memory.

6. The computerized component of claim 1, wherein the memory profile is organized with a profile header, the profile header used for a plurality of memory profiles to configure an operating range of the environmental variable.

7. The computerized component of claim 1, wherein the memory profile is organized with a profile header, the profile header including a stored environmental variable, the stored environmental variable being the state of an environmental variable when the memory profile was saved.

8. The computerized component of claim 7, wherein the profile header includes an operating range of the environmental variable.

9. A method comprising:

detecting, at a computerized component installed in a vehicle, an ambient environmental variable;

determining a memory profile corresponding to the ambient environmental variable;

accessing memory parameters from the memory profile; and configuring memory of the computerized component based on the accessed memory parameters.

10. The method of claim 9, wherein the memory profile includes a frequency and a voltage to configure the memory.

* * * * *